(12) United States Patent
Tanaka et al.

(10) Patent No.: US 6,577,103 B2
(45) Date of Patent: Jun. 10, 2003

(54) EMERGENCY POWER SYSTEM, AND SYSTEM FOR AUTOMATICALLY DETECTING WHETHER OR NOT FAILURE OF SINGLE CELL OCCURS IN BATTERY FOR USE IN THE SYSTEM

(75) Inventors: Kouji Tanaka, Yokohama (JP); Koichi Nakahata, Yokohama (JP); Akiyasu Okuno, Yokohama (JP); Keiichi Mori, Nagoya (JP); Akihiro Bito, Nagoya (JP)

(73) Assignees: The Tokyo Electric Power Company, Inc., Chiyoda-Ku (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/815,963

(22) Filed: Mar. 23, 2001

(65) Prior Publication Data

US 2001/0048286 A1 Dec. 6, 2001

(30) Foreign Application Priority Data

Mar. 28, 2000 (JP) ......................................... 2000-089333

(51) Int. Cl.[7] .............................. H02J 7/00; H01M 4/50
(52) U.S. Cl. .......................... 320/116; 307/66; 429/224
(58) Field of Search ................................ 320/116, 132; 307/46, 66; 429/224; 363/34, 35, 37

(56) References Cited

U.S. PATENT DOCUMENTS

| | | | | |
|---|---|---|---|---|
| 4,639,656 A | * | 1/1987 | Mukai ................. | 320/DIG. 10 |
| 4,719,550 A | * | 1/1988 | Powell et al. .................. | 363/37 |
| 4,751,398 A | * | 6/1988 | Ertz, III ....................... | 307/66 |
| 5,160,851 A | * | 11/1992 | McAndrews ................. | 307/66 |
| 5,563,778 A | * | 10/1996 | Oh .............................. | 363/37 |
| 5,781,448 A | * | 7/1998 | Nakamura et al. ............ | 307/66 |
| 5,962,160 A | * | 10/1999 | Oyama et al. ............... | 429/104 |
| 5,978,236 A | * | 11/1999 | Faberman et al. ............ | 363/37 |
| 6,132,902 A | * | 10/2000 | Miyasaka et al. ........... | 429/224 |
| 6,157,164 A | * | 12/2000 | Jaworski et al. ............ | 320/116 |
| 6,208,194 B1 | * | 3/2001 | Kennedy .................... | 327/427 |

OTHER PUBLICATIONS

U.S. patent application Ser. No. 09/853,535, Abe, filed May 1, 2001.

* cited by examiner

*Primary Examiner*—Michael Sherry
*Assistant Examiner*—Pia Tibbits
(74) *Attorney, Agent, or Firm*—Burr & Brown

(57) ABSTRACT

The present invention provides a space-saving and low-cost emergency power system, which can be installed on a narrow place having limited space and employs a battery that is long in service life and low in frequency of replacement. This emergency power system comprises a circuit having a DC load, a rectifier, and a battery, which are electrically connected to one another. This circuit is adapted so that normally, DC power is supplied from the rectifier to the DC load, and the battery is charged, and that in an emergency, such as a power failure, in which an outage of the rectifier occurs, electric power is automatically supplied from the battery to the DC load. In this system, a sodium sulfur battery is employed as the battery.

9 Claims, 8 Drawing Sheets

UPPER GRAPH: CHARGING VOLTAGE & DISCHARGING VOLTAGE OF SODIUM SULFUR SINGLE CELL
LOWER GRAPH: SODIUM SULFUR SINGLE CELL DISCHARGE DEPTH

UPPER GRAPH: CHARGING VOLTAGE & DISCHARGING VOLTAGE OF SODIUM SULFUR SINGLE CELL
LOWER GRAPH: SODIUM SULFUR SINGLE CELL DISCHARGE DEPTH

FIG. 10 - Prior Art
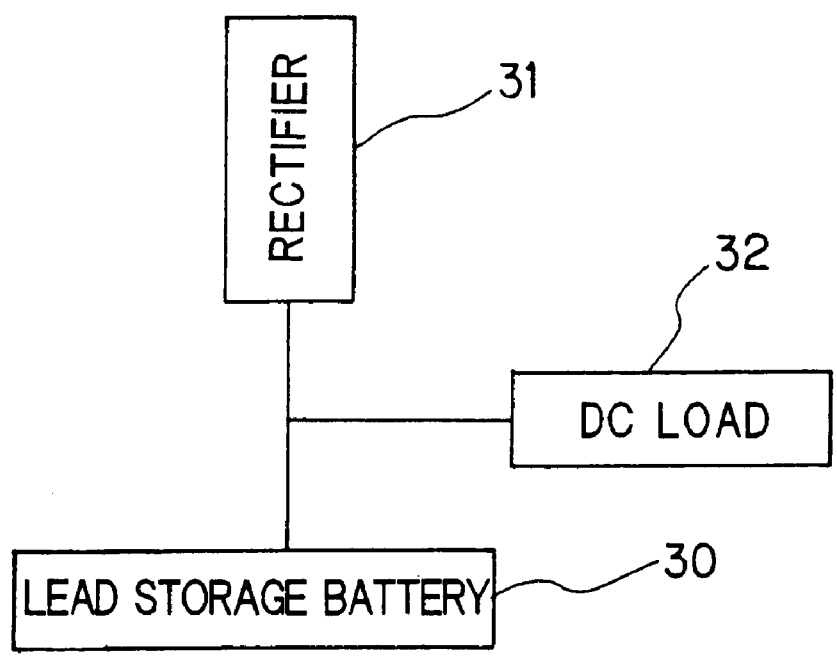

EMERGENCY POWER SYSTEM, AND SYSTEM FOR AUTOMATICALLY DETECTING WHETHER OR NOT FAILURE OF SINGLE CELL OCCURS IN BATTERY FOR USE IN THE SYSTEM

BACKGROUND OF THE INVENTION

1. Field of the Invention

The present invention generally relates to an emergency power system, and to a system for automatically detecting whether not a failure of a single cell occurs in a battery for use in the system.

2. Description of the Related Art

FIG. 10 illustrates a float charging system employing a lead acid battery 30 in an emergency power system. Ordinarily, DC power is supplied from a rectifier 31 to a DC load 32. A constant voltage is applied to the lead acid battery 30. Thus, a self-discharged quantity of energy is charged into the lead acid battery 30. Consequently, the lead acid battery 30 is continually kept in a fully charged condition. In the case of an emergency, for example, in the event of an outage of the rectifier 31, electric power is supplied from the DC load 32 to the lead acid storage battery 30. Thus, in the case of an emergency, for instance, in the event of a power failure, the conventional emergency power system can supply electric power to the DC load without an outage of power to the DC load.

However, the conventional emergency power system has drawbacks in that the system requires a large space for placing a lead storage battery therein, due to a low energy density thereof, and thus, the conventional system cannot be installed in a narrow place having limited space. Moreover, the conventional emergency power system has additional drawbacks in that the service life of the lead acid storage battery is short, which causes the frequency of replacement of the battery to be relatively high. Furthermore, the cost of the lead acid battery is relatively high.

The invention is accomplished in view of the aforementioned drawbacks. Accordingly, an object of the invention is to provide a space-saving emergency power system that can be placed in a narrow place having limited space. Further, another object of the invention is to provide a low-cost emergency power system employing a battery that is long in service life and low in frequency of replacement. Moreover, another object of the invention is to provide a system for detecting whether or not a single cell failure occurs in a battery used in an emergency power system.

SUMMARY OF THE INVENTION

To achieve the foregoing objects, according to an aspect of the invention, there is provided an emergency power system that includes a circuit having a DC load, a rectifier, and a battery, which are electrically connected to one another. The circuit is adapted so that normally, DC power is supplied from the rectifier to the DC load, and the battery is charged. In an emergency, such as a power failure, in which an outage of the rectifier occurs, electric power is automatically supplied from the battery to the DC load. In this system, the battery is a sodium sulfur battery.

Further, in an embodiment of the invention, preferably, a rectifier output voltage controller is provided between the rectifier and the sodium sulfur battery for lowering, when the voltage of the sodium sulfur battery reaches a level that is equal to or higher than the predetermined charging voltage, an output voltage of the rectifier thereby to automatically discharge energy from the sodium sulfur battery to the DC load. The rectifier output voltage controller also operates to raise, when the voltage of the sodium sulfur battery reaches a level that is equal to or lower than the predetermined discharging voltage, an output voltage of the rectifier to thereby charge the sodium sulfur battery.

Further, in an embodiment of the emergency power system of the invention, preferably, the predetermined charging voltage and the predetermined discharging voltage of the sodium sulfur battery are within a discharge depth range in the case that the composition of an active material accommodated in a positive electrode chamber of each of sodium sulfur single cells is in a two-phase region.

Further, in an embodiment of the invention, it is preferable that the sodium sulfur battery is an assembled battery obtained by constituting strings, each consisting of a predetermined number of series-connected single cells, and then parallel-connecting a predetermined number of the strings. An output voltage of the rectifier is controlled by monitoring whether or not a module voltage reaches the predetermined charging voltage and whether or not the module voltage reaches the predetermined discharging voltage.

Furthermore, preferably, an embodiment of the invention detects an occurrence of a malfunction of a single cell according to whether or not the difference $\Delta V$ ($=V_{ocv}-V_m$) between the no-load module open circuit voltage $V_{ocv}$ and the constant-resistance-load module voltage $V_m$ is larger than an initially determined normal voltage difference $\Delta V_n$ ($\Delta V > \Delta V_n$). An alarm is generated when a malfunction of a single cell occurs, thus maintaining the function of continually serving as an emergency power system.

The above-discussed detection of malfunctions is governed by the following principles. The voltage difference in the case of no occurrence of a malfunction is: $\Delta V = I \cdot R$, where I is the module current, and R is the module resistance. When a malfunction of a single cell occurs, the resistance R rises, which, in turn, causes a corresponding increase in the voltage difference $\Delta V$.

According to the invention, there is provided another emergency power system, which includes a circuit consisting of a DC load, a rectifier and a battery electrically connected to one another and adapted so that under normal operating conditions, DC power is supplied from the rectifier to the DC load at a constant voltage, and the battery is charged. In an emergency situation, including a power failure, in which an outage of the rectifier occurs, power is supplied from the battery to the DC load. In this system, the battery is a sodium sulfur battery.

A controller having a timer is provided between the rectifier and the sodium sulfur battery and interrupts or connects an output of the rectifier. When the current from the sodium sulfur battery reaches a level that is equal to or lower than a predetermined charging current, an output of the rectifier is interrupted, and energy is automatically discharged from the sodium sulfur battery to the DC load for a predetermined period. After energy is discharged from the battery for the predetermined period, the output of the rectifier is connected to the sodium sulfur battery so as to charge the battery.

According to the invention, there is provided yet another emergency power system, which includes a circuit including a DC load, a rectifier and a battery electrically connected to one another and adapted so that under normal operating conditions, DC power is supplied from the rectifier to the DC load at a constant voltage, and the battery is charged. In an emergency situation, including a power failure, in which an outage of the rectifier occurs, power is supplied from the battery to the DC load. In this system, the battery is a sodium sulfur battery. The power system further comprises a controller which interrupts or connects an output of the rectifier. When a voltage of said sodium sulfur battery reaches a level that is equal to or higher than a predetermined charging voltage, an output of the rectifier is interrupted, and energy is automatically discharged from the sodium sulfur battery to the DC load. When the voltage of the sodium sulfur battery reaches a level that is equal to or lower than a predetermined discharging voltage, the output of the rectifier is connected to the sodium sulfur battery so as to charge the battery.

According to the invention, there is provided still another emergency power system, which includes a circuit consisting of a DC load, a rectifier and a battery electrically connected to one another. A diode, the forward direction of electrical conduction of which is a direction from the battery to said DC load, and a first switch are provided between the rectifier and the sodium sulfur battery. This emergency power is adapted so that under normal operating conditions, DC power is supplied from the rectifier to the DC load, and that in an emergency, including a power failure, in which an outage of the rectifier occurs, power is supplied from the sodium sulfur battery to the DC load through the diode.

This emergency power system further includes a control, provided between the sodium sulfur battery and the first switch, for putting, after discharge of the battery in an emergency, the first switch into a connected state and for charging the sodium sulfur battery to a predetermined discharge depth using power supplied from the rectifier. The first switch is thereafter interrupted to hold the sodium sulfur battery in a state in which power from the rectifier is prevented by the diode from being supplied to the battery.

Incidentally, in this emergency power system, practical means for putting the first switch into a connected state to thereby charge the sodium sulfur battery to a predetermined discharge depth by supplying power from the rectifier performs the charging until a charging current reaches a level that is equal to or lower than a set current, or until a module voltage is equal to or lower than a predetermined voltage. It is preferable for reducing a discharge starting voltage drop in an emergency that upon completion of charging, the discharge depth is increased by discharging a predetermined quantity of electricity (20 to 40 Ah).

An embodiment of the emergency power system further includes another circuit, provided between the circuit consisting of the diode and the first switch electrically parallel-connected and the sodium sulfur battery, for supplying discharging current of the sodium sulfur battery to a heater, and a second switch, provided between the heater and the sodium sulfur battery.

In this system, a temperature control operation is performed by controlling the on/off of the second switch according to the temperature of the sodium sulfur battery under the control of the controller, which is provided among the sodium sulfur battery, the first switch and the second switch. The sodium sulfur battery is maintained at a constant discharge depth and at a constant temperature by repeating one cycle consisting of steps of discharging energy from the sodium sulfur battery to the heater, and then charging energy from the rectifier to the sodium sulfur battery at each predetermined time interval under the control of the controller, which has a timer. The first switch is put into an interrupted state when the voltage or current of the sodium sulfur battery reaches a level that is equal to or higher than a predetermined voltage, or that is equal to or lower than a predetermined current, to thereby stop charging of the battery.

According to the invention, there is provided a detection system for automatically detecting an occurrence of a malfunction of a single cell in a battery used in an emergency power system. The detection system includes a first circuit consisting of a DC load, a rectifier, and a sodium sulfur battery electrically connected to one another. A second circuit is provided and consists of a diode, the forward direction of electrical conduction of which is a direction from the battery to the DC load, and a first switch parallel-connected to each other. A third circuit is provided between the second circuit and the sodium sulfur battery and supplies a discharging current from the sodium sulfur battery to a heater, and a second switch is provided between the heater and the sodium sulfur battery. The detection system is adapted so that under normal operating conditions, DC power is supplied from the rectifier to the DC load, and that in an emergency, including a power failure, in which an outage of the rectifier occurs, power is supplied from the sodium sulfur battery through the diode to the DC load.

This detection system further includes a controller provided among the sodium sulfur battery, the first switch, and the second switch. In this detection system, a temperature control operation is performed by controlling the on/off of the second switch according to a temperature of the sodium sulfur battery by the controller. The sodium sulfur battery is maintained at a constant discharge depth and at a constant temperature by repeating one cycle including the steps of discharging energy from the sodium sulfur battery to the heater, charging energy from the rectifier to the sodium sulfur battery at each predetermined time interval under the control of the controller, which has a timer, and putting the first switch into an interrupted state and stopping charging when a voltage or current of the sodium sulfur battery reaches a level that is equal to or higher than a predetermined voltage or that is equal to or lower than a predetermined current. Thus, an occurrence of a malfunction of a single cell in the sodium sulfur battery is automatically detected by monitoring a discharging current during energy discharge from the sodium sulfur battery to the heater.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 10 is a diagram illustrating a conventional emergency power system.

DETAILED DESCRIPTION OF THE INVENTION

Hereinafter, the preferred embodiments of the invention will be described in detail by referring to the accompanying drawings. However, needless to say, the invention is not limited to the following embodiments.

An emergency power system of the invention features the employment of a sodium sulfur battery as a power storage battery.

Figure 1:
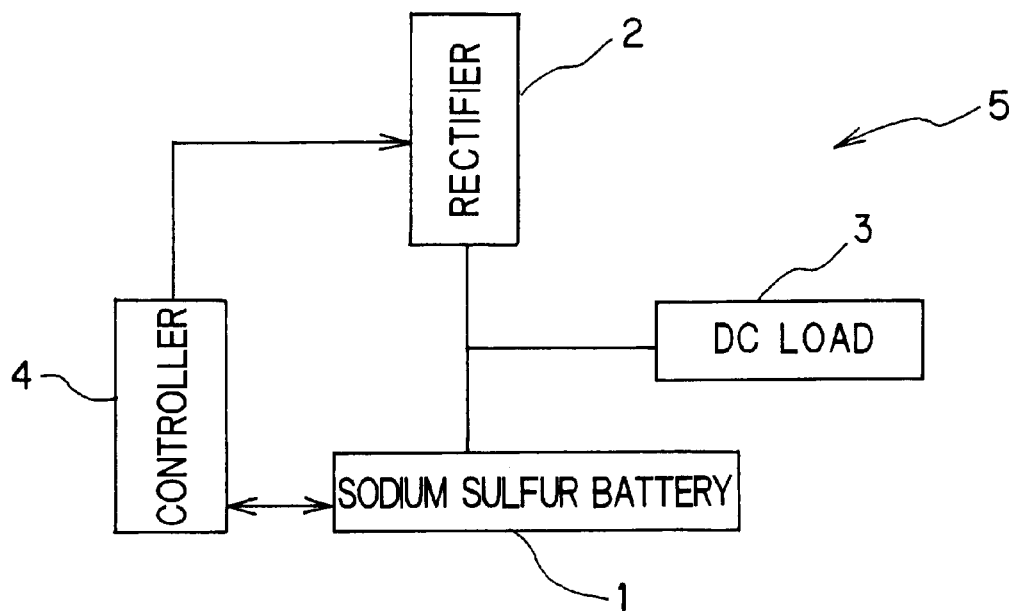
FIG. 1 is a diagram illustrating an embodiment of an emergency power system of the invention.

As illustrated in FIG. 1, the emergency power system of the invention has a circuit constituted by electrically connecting a rectifier 2, a sodium sulfur battery 1, and a DC load 3 to one another. Normally, DC power is supplied from the rectifier 2 to the DC load 3, and the sodium sulfur battery 1 is charged. When a power failure occurs, electric power is supplied from the sodium sulfur battery 1 to the DC load 3.

At ordinary times, the charging of the sodium sulfur battery 1 by the rectifier 2 is performed until the voltage level of the sodium sulfur battery 1 reaches a level that is equal to or higher than a predetermined level. A controller 4 is provided in the circuit and operative to control the voltage level of the rectifier 2 according to the voltage supplied from the sodium sulfur battery 1. The voltage level of the rectifier 2 is lowered when the voltage level of the sodium sulfur battery 1 reaches a predetermined charging voltage. Then, energy is automatically discharged from the sodium sulfur battery 1 to the DC load 3 until the voltage level of the battery 1 reaches a level that is equal to or lower than a predetermined discharging voltage. At a moment at which the battery 1 reaches the predetermined discharging voltage, the voltage level of the rectifier 2 is raised. Thus, the sodium sulfur battery 1 is charged up to the predetermined charging voltage.

In the system of the invention, an output voltage of the rectifier 2 is controlled so that the sodium sulfur battery 1 is repeatedly and alternatively charged and discharged between the predetermined voltages. In other words, charging and discharging occurs within a constant discharge depth range in the sodium sulfur single cell.

Table 1, which is provided below, provides a comparison between a conventional lead acid battery and a NAS battery.

TABLE 1

| | Substitute specification Appendix A | |
|---|---|---|
| Item | Lead acid Battery MSE Type | NAS battery G50kW |
| Chemical Substance | | |
| Negative Electrode | Pb | Na |
| Positive Electrode | $PbO_2$ | S |

TABLE 1-continued

| | Substitute specification Appendix A | |
|---|---|---|
| Item | Lead acid Battery MSE Type | NAS battery G50kW |
| Electrolytic Solution (Electrolyte) | $H_2SO_4$ | β-alumina |
| Cell Voltage | | |
| Nominal | 2.0 V | 2.075 V |
| Operating Temperature | −15~45° C. | 280–360° C. |
| Energy Density | | |
| Wh/kg | 32.6 | 110 |
| Wh/l | 66 | 130 |
| Self-Discharge Rate | ≦0.1%/day (25° C.) | None |
| Expected Life | 7~9 years | 15 years |
| Maintenance | Maintenance-Free Water Supply, Specific Gravity measurement, Even Charge, Component Replacement | Maintenance-Free |
| Efficiency (Initial) | | |
| Ah Efficiency | 90% | 100% |
| Wh Efficiency | 75% | 70% |
| Internal Resistance | 0.10 Ω · Ah | 0.7 Ω · Ah |
| Float Charging | Permitted (When Not Performed, Capacity Is Reduced Due to Accidental Discharge) | Protection Circuit Is Needed (Checking Is Needed) |
| Merits | Immediate Utilization Possible Room Temperature Operation Possible Float Charging Possible | High Energy Density No Self-Discharge High Energy Efficiency |
| Defects | Low Energy Density High Self-Discharge Rate Short Life Generation of Hydrogen by Overcharge Low Energy Efficiency | Temperature Rising Needed High Temperature Operation Heat Reserving Power Is Needed during Un- used Float Charging Impossible High Internal Resistance |

As is seen from TABLE 1, which compares the sodium sulfur battery and the lead storage battery to one another, the energy density of the sodium sulfur battery is extremely high and nearly four times that of the lead storage battery. Therefore, the system of the invention employs a sodium sulfur battery as the storage battery. Consequently, because higher energy density cells can be made to be smaller, the system of the invention can exceedingly save space.

However, the float charging voltage cannot be applied to the sodium sulfur battery, which is different from that of the lead storage battery. In the case of the lead storage battery, a constant voltage is applied from the rectifier thereto. Thus, even when the lead storage battery is continuously charged in a fully charged state, water contained in electrolytic solution is dissolved. Thus, the charging energy is absorbed thereto, so that the lead storage battery does not malfunction.

Figure 2:
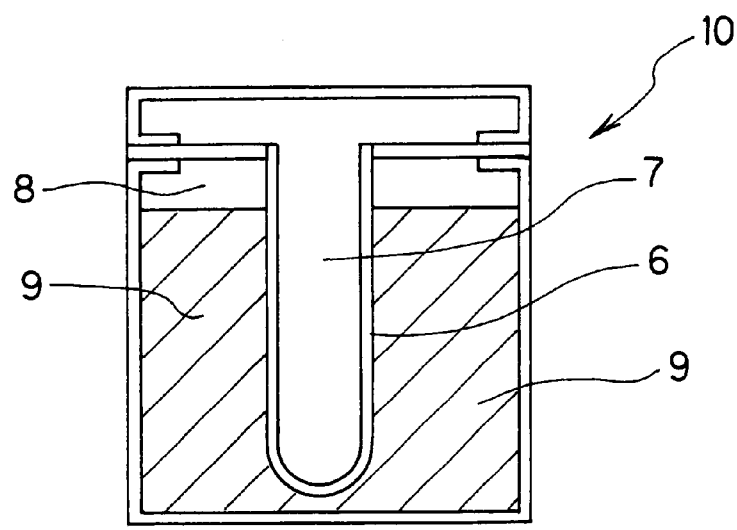
FIG. 2 is a schematic diagram illustrating the structure of a sodium sulfur battery.

In contrast, in the sodium sulfur battery, as illustrated in FIG. 2, a single cell structure has a positive electrode chamber 8 and a negative electrode chamber 7, which are partitioned off by a bottomed solid electrolyte tube 6 made of β-alumina. A positive electrode conductive material 9 impregnated with sulfur serving as a positive electrode active material is accommodated in the positive electrode chamber 8. Sodium, which serves as a negative electrode active material, is accommodated in the negative electrode chamber 7. The single cell is made to operate at 300° C. or so. Further, when discharged, sodium is changed into sodium ions that move in the β-alumina tube 6 and react with sulfur accommodated in the positive electrode to thereby generate sodium polysulfide $Na_2S_x$. Incidentally, the composition of the sodium polysulfide varies with a discharge depth.

On the other hand, in the case of charging, the sodium ions contained in the positive electrode chamber 8 move in the β-alumina tube 6 and are then returned to the negative electrode chamber 7 as sodium metal. In the case that charging is continuing in a state in which sodium ions in the positive electrode chamber 8 are extremely reduced, a high applied voltage is concentrated on the β-alumina tube 6. This causes a problem that the β-alumina tube 6 is damaged, or that the sodium ions of a β-alumina crystal move to the negative electrode and thus cannot be maintained. In the case of discharging, similar problems occur when the discharge is excessively continued.

Thus, according to the invention, the charge and discharge of the sodium sulfur battery are repeated within a discharge depth range in which the battery does not malfunction. It is preferable for preventing an occurrence of a malfunction of the battery that the predetermined charging voltage and the predetermined discharging voltage are those in the case where the composition of the active material accommodated in the positive electrode chamber is in a two-phase region.

Further, as described in TABLE 1, the energy efficiency of the sodium sulfur battery is relatively high, as compared with the lead acid storage battery. It is preferable for lowering polarization resistance and enhancing the energy efficiency still more to set the predetermined charging voltage and the predetermined discharging voltage at values in the case that the composition of the active material accommodated in the positive electrode chamber is in the two-phase region.

Moreover, as described in TABLE 1, the sodium sulfur battery has a long service life, which is twice or more that of the lead storage battery. Thus, using the sodium sulfur battery in the emergency power system reduces the cost of the emergency power system.

Figure 3:
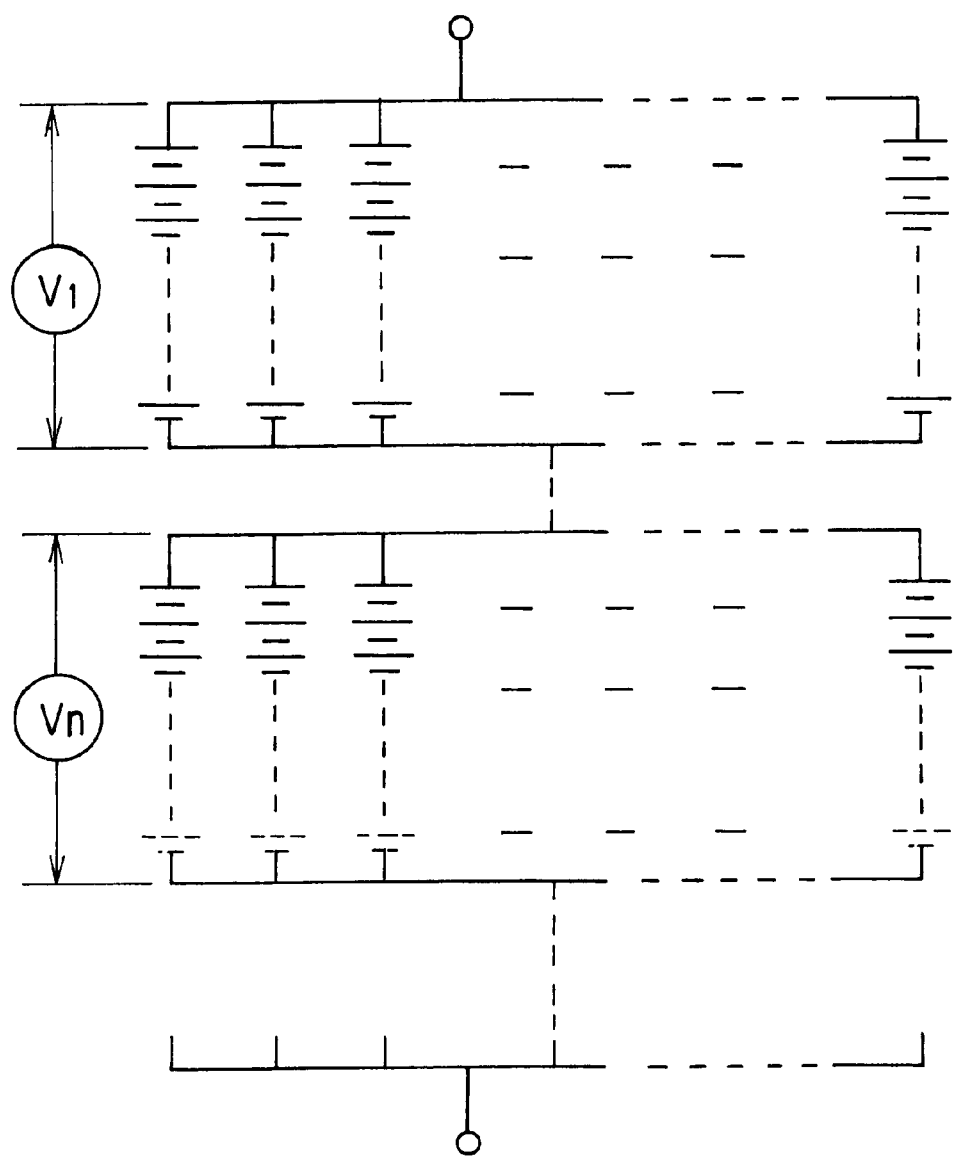
FIG. 3 is a diagram illustrating an example of a sodium sulfur battery.

Further, it is preferable for preventing an occurrence of a malfunction of a single cell that the sodium sulfur battery is an assembled battery obtained by constituting strings, each of which is obtained by series-connecting a predetermined number of sodium sulfur single cells, and then parallel-connecting a predetermined number of the strings, as illustrated in FIG. 3. In addition, it is preferable that the system has a controller for controlling the charging and discharging of the sodium sulfur battery by raising and lowering the voltage of the rectifier when the module voltage reaches a predetermined voltage.

Furthermore, it is preferable, for continually maintaining the functions of the emergency power system, that an occurrence of a malfunction of a single cell is detected by monitoring whether or not the difference ΔV (=Vocv−Vm) between a no-load module open circuit voltage Vocv, a constant-resistance-load module voltage Vm and a normal voltage difference ΔVn meet the following condition: ΔV>ΔVn. An alarm is generated in the event of a malfunction of a single cell in the module.

Further, another embodiment of the invention has a controller for interrupting or connecting an output of the rectifier, instead of the controller for controlling the raising and lowering of the voltage of the rectifier when the voltage of the sodium sulfur battery reaches the predetermined charging voltage or the predetermined discharging voltage.

Electric power is automatically supplied in such an embodiment from the sodium sulfur battery to the DC load by interrupting the output of the rectifier when the voltage of the sodium sulfur battery reaches a level that is equal to or higher than the predetermined charging voltage. In the case that the output of the rectifier is connected to the battery when the voltage of the sodium sulfur battery becomes lower than the predetermined discharging voltage, the sodium sulfur battery is charged by the rectifier. Thus, a space-saving emergency power system is realized without a malfunction of the sodium sulfur battery through the use of a controller which monitors the charging and discharging voltages of the sodium sulfur battery and interrupts or connects the output of the rectifier depending upon the voltage level of the sodium sulfur battery.

Figure 4:
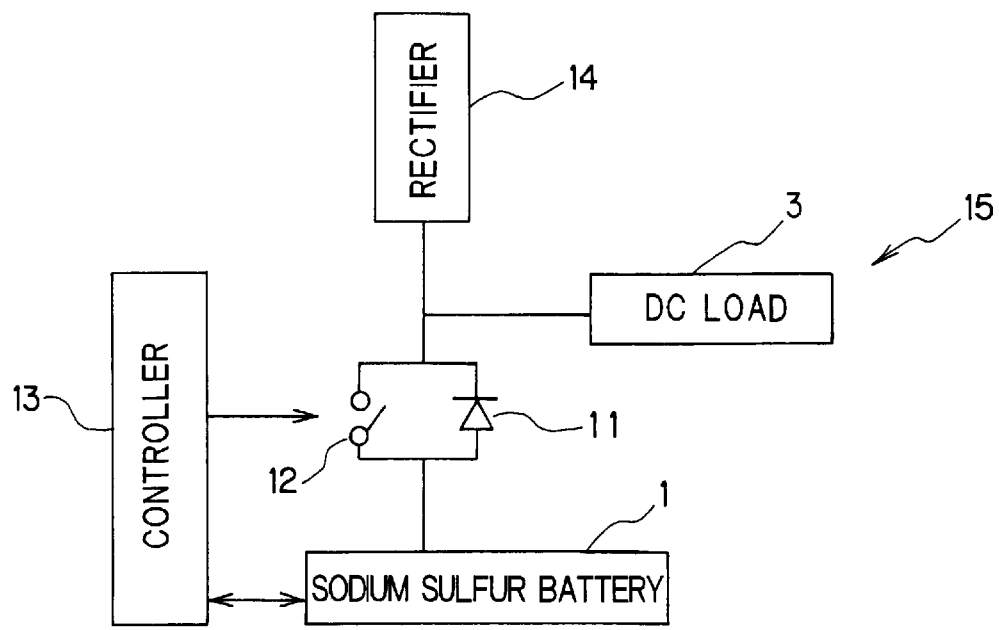
FIG. 4 is a diagram illustrating another embodiment of the emergency power system of the invention.

FIG. 4 is a diagram illustrating the configuration of another embodiment of the invention. As shown in FIG. 4, a circuit in which a DC load 3, a general-purpose rectifier 14, and a sodium sulfur battery 1 are electrically connected to one another. A circuit consists of a diode 11, the forward direction of electrical conduction of which is a direction from the sodium sulfur battery 1 to the DC load, and a first switch, which are parallel-connected, and is provided between the general purpose rectifier 14 and the sodium sulfur battery 1. At ordinary times, DC power is supplied from the general purpose rectifier 14 to the DC load 3. In an emergency, such as an outage of the general purpose rectifier 14 during a power failure, electric power is supplied from the sodium sulfur battery 1 to the DC load 3 through the diode 11.

After the discharge of the sodium sulfur battery 1 due to the emergency, the first switch 12 is put into a connected state by the controller 13, which is provided between the sodium sulfur battery 1 and this switch 12, so that the sodium sulfur battery 1 is charged to a voltage level, which is equal to or higher than the predetermined charging voltage or current, by supplying electric power from the general purpose rectifier 14 to the sodium sulfur battery 1. The emergency power system 15 is adapted so that when the voltage level of the battery 1 reaches a level that is equal to or lower than the predetermined charging voltage or current, the first switch 12 is brought into an interrupted state, and the sodium sulfur battery 1 is maintained in a state in which there is no voltage being applied from the general purpose rectifier 14 to battery 1.

The emergency power system 15 does not continuously perform the charge/discharge cycle of the sodium sulfur battery 1. Rather, emergency power system 15 automatically discharges the sodium sulfur battery 1 to the predetermined discharging voltage, which is the limit, only in emergency situations. After the discharge, the emergency system 15 maintains the battery 1 in such a state. At normal times, the system puts the first switch 12 into a connected state to thereby charge the battery 1 to the predetermined voltage. The charging operation is manually or automatically performed after an occurrence of a power failure during an emergency.

The emergency power system of this type has an advantage in that the general purpose rectifier used in the conventional emergency power system can be utilized in this embodiment without any modification.

Figure 5:
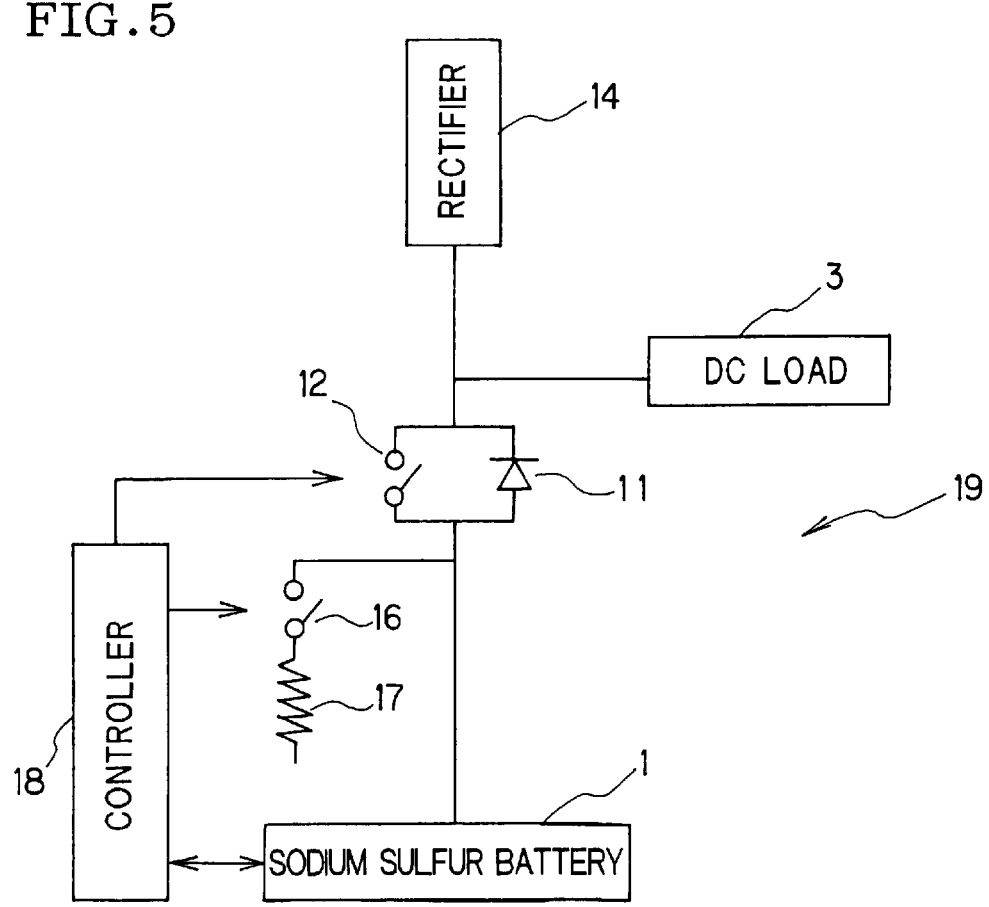
FIG. 5 is a diagram illustrating another embodiment of the emergency power system of the present invention.

FIG. 5 is a diagram illustrating another embodiment of the invention illustrated in FIG. 4. The embodiment of the invention illustrated in FIG. 5 has a circuit for supplying discharging current to a heater 17, which is provided between the circuit consisting of the diode 11 and the first switch 12, which are parallel-connected, and the sodium sulfur battery 1. This embodiment also has a second switch 16 provided between the heater 17 and the sodium sulfur battery 1, and a controller 18, provided between the sodium sulfur battery 1 and each of the first switch 12 and the second switch 16, for controlling the interruption and connection of the switches 12 and 16.

In such a circuit, the on/off of the second switch 16 is controlled according to the temperature of the sodium sulfur battery 1. Then, the temperature of the battery is maintained by discharging energy from the sodium sulfur battery 1 to the heater 17. The controller 18 having a timer causes the general purpose rectifier 14 at each predetermined time interval to charge the sodium sulfur battery 1. When the voltage of the charged battery reaches a level that is equal to or higher than the predetermined voltage or that is equal to or lower than the predetermined current, the first switch 12 is put into an interrupted state. Then, the battery 1 is charged. This process is employed as one cycle. In the emergency power system 19, the sodium sulfur battery 1 is maintained at a constant discharge depth and at a constant temperature by repeating the above cycle.

In addition to the advantage that the rectifier used in the conventional emergency power system using the lead storage battery can be used therein without modification. The emergency power system 19 has advantages in that whether a malfunction of a single cell occurs can be continuously monitored. Thus, the functions of the system, including the self-diagnostic function, can be continually maintained because electric current is fed to and flows through the heater.

Furthermore, the emergency power system of this type has another advantage in that the heater can be used as a heat reserving heater for the sodium sulfur battery.

Figure 6:
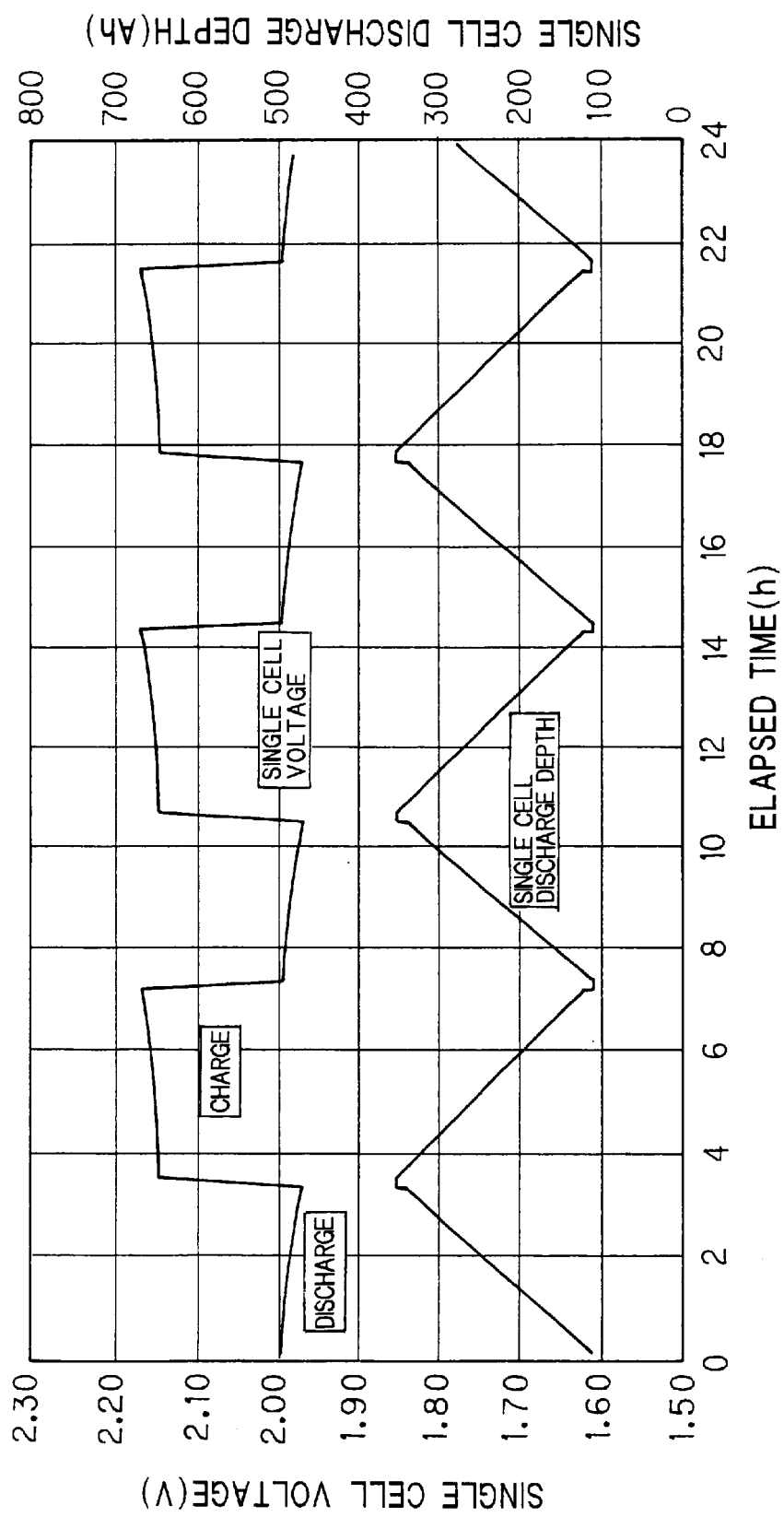
FIG. 6 is a diagram illustrating an example of charge/discharge characteristics of a sodium sulfur single cell of the emergency power system of the invention.
Figure 7:
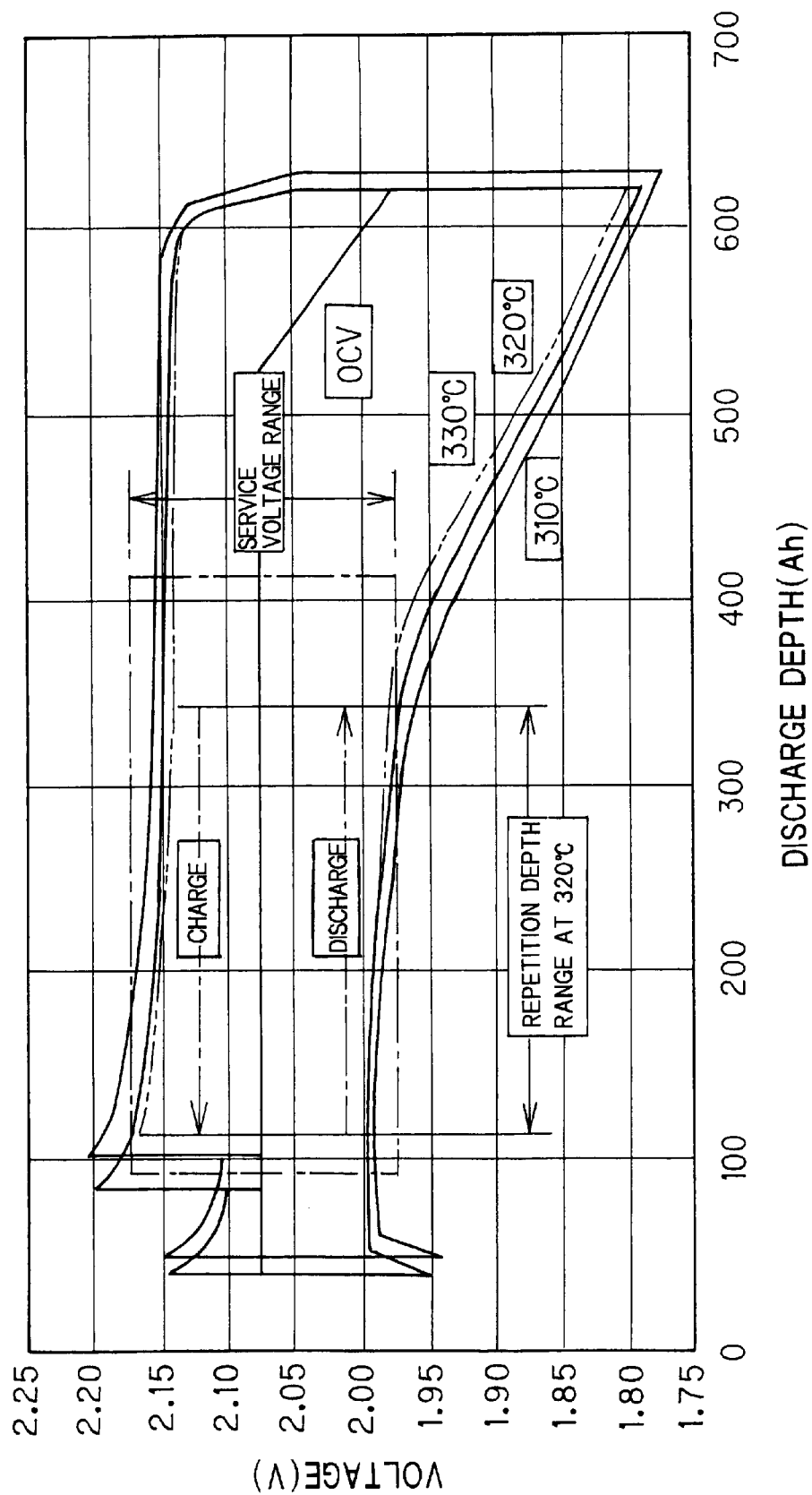
FIG. 7 is a diagram illustrating an example of the relationship among the charging voltage, the discharging voltage, and the depth of charge and discharge of a sodium sulfur single cell of the emergency power system of the invention.

FIGS. 6 and 7 illustrate the characteristics and operations of one embodiment of the invention, which uses the circuit shown in FIG. 1 and is adapted to repeat the charge/discharge of the sodium sulfur battery by controlling the output voltage of the rectifier. The charge/discharge of the sodium sulfur single cell is also repeated in a range between the constant discharge depths.

In the case of the single cell operated at an operating temperature of 320° C., the predetermined charging voltage is 2.17 V. Further, the predetermined discharging voltage is 1.98 V. The discharge depth is 100 Ah to 350 Ah. The discharging current is 73 A and the charging current is 64 A. Furthermore, the total energy capacity and the charge capacity of each of the cells of the sodium sulfur battery are 62.4 kWh and 600 Ah/52cells, respectively.

Figure 8:
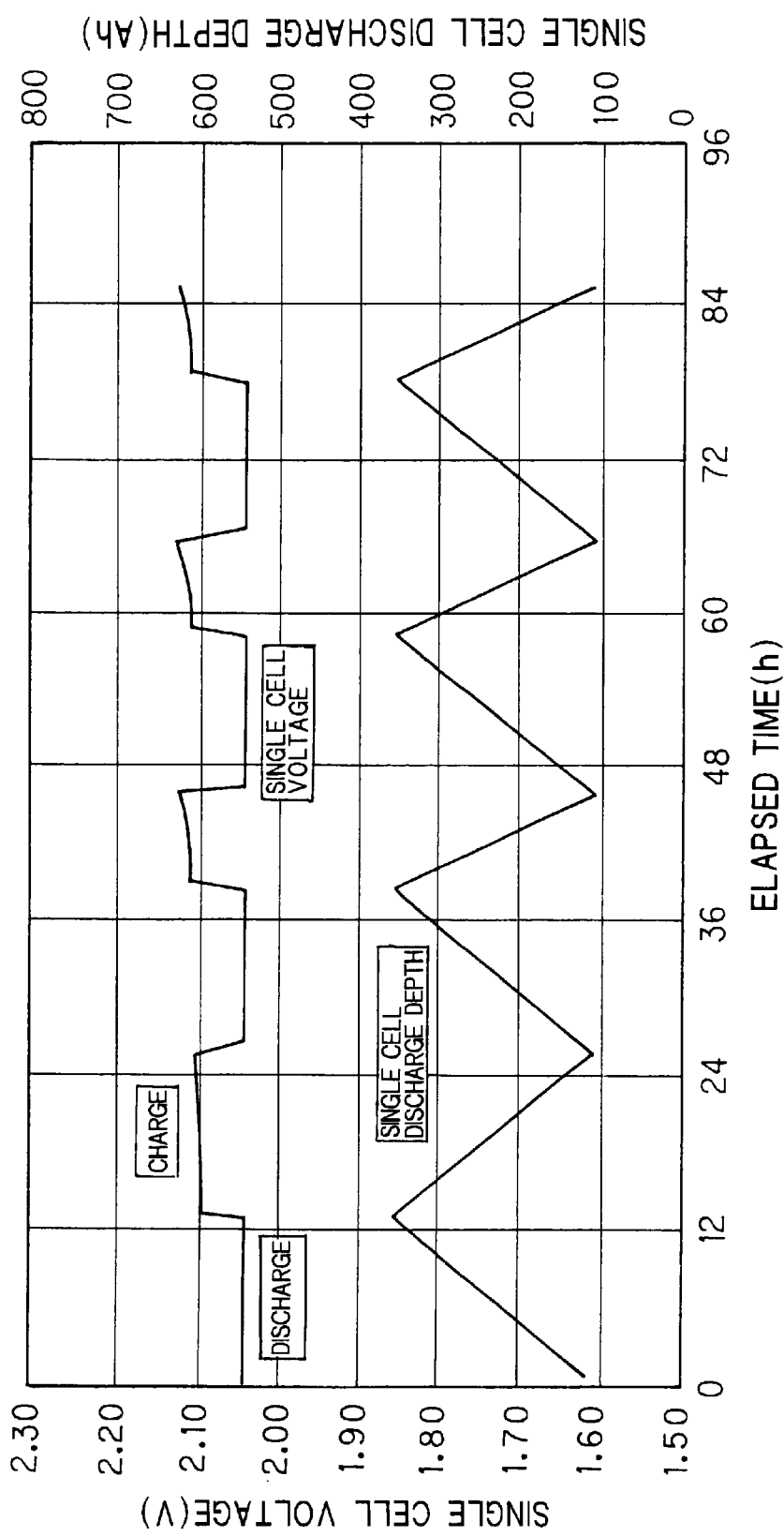
FIG. 8 is a diagram illustrating another example of charge/discharge characteristics of a sodium sulfur single cell of the emergency power system of the invention.
Figure 9:
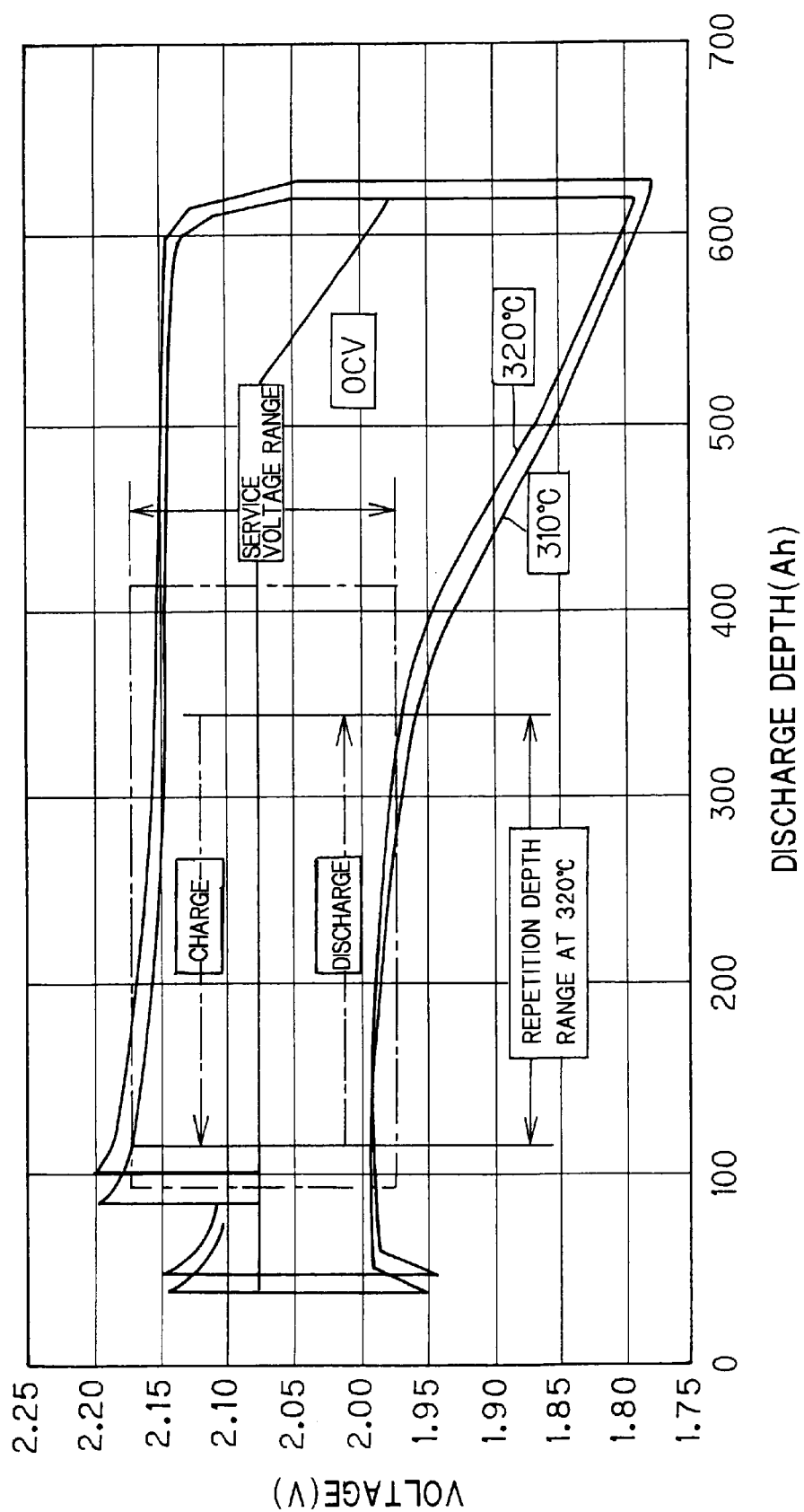
FIG. 9 is a diagram illustrating an example of the relationship among the charging voltage, the discharging voltage, and the depth of charge and discharge of a sodium sulfur single cell of the emergency power system of the invention.

FIGS. 8 and 9 illustrate the characteristics and operations of one embodiment of the invention, which uses the circuit shown in FIG. 5 and is adapted to control the on/off of the second switch according to the temperature of the sodium sulfur battery and to maintain the temperature by discharging energy from the sodium sulfur battery to the heater. A controller is used, which has a timer, which causes the general purpose rectifier at each predetermined time interval to charge the sodium sulfur battery. This embodiment of the invention establishes a process of one cycle consisting of the steps of putting the first switch into an interrupted state when the voltage of the charged battery reaches a level that is equal to or higher than the predetermined voltage or that is equal to or lower than the predetermined current, and then charging the battery and then repeating this cycle. Thus, the sodium sulfur battery 1 is maintained at a constant discharge depth and at a constant temperature and the charge/discharge of the sodium sulfur single cell is repeated within a range between the constant discharge depths.

In the case of the single cell operated at an operating temperature of 320° C., the predetermined charging voltage is 2.17 V. Further, the predetermined discharging voltage is 1.98 V. The discharge depth is 100 Ah to 350 Ah. The discharging current is 73 A and the charging current is 64 A. Furthermore, the total energy capacity and the charge capacity of each of the cells of the sodium sulfur battery are 62.4 kWh and 600 Ah/52cells, respectively.

As described above, the emergency power system of the invention can save space and achieve a long service life while reducing the maintenance cost thereof. Thus, a low-cost emergency power system is realized. Further, the system for automatically detecting an occurrence of a single cell failure in the battery used in the emergency power system of the invention has a self-diagnostic function of self-diagnosing a storage battery malfunction. Thus, the emergency power system of the invention has an advantage in that the function of serving as an emergency power supply can be maintained at all times.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An emergency power system, comprising a circuit having a DC load, a rectifier and a sodium sulfur battery electrically connected to one another, and a rectifier output voltage controller provided between said rectifier and said sodium sulfur battery, wherein DC power is supplied from said rectifier to said DC load under normal operating conditions and said battery is charged by said rectifier, and electric power is automatically supplied from said battery to said DC load during a power failure or an outage of said rectifier, wherein said output voltage controller lowers an output voltage of said rectifier when a voltage of said sodium sulfur battery reaches a level that is equal to or higher than a predetermined charging voltage, and thus automatically discharges energy from said sodium sulfur battery to said DC load, and said rectifier output voltage controller raises an output voltage of said rectifier when the voltage of said sodium sulfur battery reaches a level that is equal to or lower than a predetermined discharging voltage, and thus charges said sodium sulfur battery.

2. An emergency power system according to claim 1, wherein the predetermined charging voltage and the predetermined discharging voltage of said sodium sulfur battery are within a discharge depth range, and a composition of an active material accommodated in a positive electrode chamber of each single cell within said sodium sulfur battery is compositionally within a two-phase region.

3. An emergency power system according to claim 1, wherein said sodium sulfur battery comprises a plurality of modules each comprising a predetermined number of parallel-connected strings, each string comprising a predetermined number of series-connected single cells, and an output voltage of the rectifier is controlled by monitoring whether a module voltage reaches the predetermined charging and discharging voltages.

4. An emergency power system according to claim 3, wherein an occurrence of a malfunction of a single cell is detected according to whether a difference between a no-load module open circuit voltage and a constant-resistance-load module voltage is larger than an initially determined normal voltage difference, and an alarm is generated at an occurrence of a malfunction of a single cell to continually maintain a function of serving as an emergency power system.

5. The emergency power system of claim 1, wherein said electric power is automatically and only supplied from said sodium sulfur battery to said DC load during a power failure or upon an outage of said rectifier.

6. An emergency power system, comprising a circuit having a DC load, a rectifier and a sodium sulfur battery electrically connected to one another, and a controller,
wherein DC power is supplied from said rectifier to said DC load at a constant voltage under normal operating conditions and said battery is charged, and power is supplied from said battery to said DC load during a power failure or an outage of said rectifier, and
wherein said controller interrupts or connects an output of said rectifier to said battery such that when a voltage of said sodium sulfur battery reaches a level that is equal to or higher than a predetermined charging voltage, an output of said rectifier to said battery is interrupted and energy is automatically discharged from said sodium sulfur battery to said DC load, and when the voltage of said sodium sulfur battery reaches a level that is equal to or lower than a predetermined discharging voltage, the output of said rectifier is connected to said sodium sulfur battery to charge said battery.

7. An emergency power system, comprising a circuit having a DC load, a rectifier and a sodium sulfur battery electrically connected to one another, a controller, and a diode having a forward direction of electrical conduction from said battery to said DC load and a first switch provided between said rectifier and said sodium sulfur battery,
wherein DC power is supplied from said rectifier to said DC load under normal operating conditions, and power is supplied from said sodium sulfur battery to said DC load through said diode during a power failure or an outage of said rectifier,
wherein said controller is provided to connect said first switch to charge said sodium sulfur battery to a predetermined discharge depth using power supplied from said rectifier after the discharge of said battery during said power failure or said outage of said rectifier, and thereafter interrupting said first switch to thereby hold said sodium sulfur battery in a state in which power from said rectifier is prevented from being supplied to said battery by said diode.

8. An emergency power system according to claim 7, further comprising another circuit provided between said circuit comprising said diode and said first switch electrically parallel-connected to one another and said sodium sulfur battery, said another circuit supplying discharging current from said sodium sulfur battery to a heater, and a second switch provided between said heater and said sodium sulfur battery,
wherein a temperature control operation is performed by controlling ON/OFF of said second switch according to a temperature of said sodium sulfur battery under the control of said controller, and
wherein said sodium sulfur battery is maintained at a constant discharge depth and at a constant temperature by repeating at least one cycle comprising the steps of discharging energy from said sodium sulfur battery to said heater, and subsequently charging energy from said rectifier to said sodium sulfur battery at predetermined time intervals under the control of said controller having a timer, and putting said first switch into an interrupted state when a voltage or current of said sodium sulfur battery reaches a level that is equal to or higher than a predetermined voltage level, or that is equal to or lower than a predetermined current level to thereby stop charging of said sodium sulfur battery.

9. A malfunction detection system for automatically detecting an occurrence of a malfunction of a single cell in a battery used in an emergency power system, said malfunction detection system comprising:
a first circuit comprising a DC load, a rectifier, and a sodium sulfur battery electrically connected to one another;
a second circuit comprising a diode and a first switch parallel-connected to one another, said diode having a forward direction of electrical conduction from said battery to said DC load;
a third circuit provided between said second circuit and said sodium sulfur battery for supplying a discharging current from said sodium sulfur battery to a heater;
a second switch provided between said heater and said sodium sulfur battery; and
a controller having a timer,
wherein DC power is supplied from said rectifier to said DC load under normal operating conditions, and power is supplied from said sodium sulfur battery through said diode to said DC load during a power failure, and
wherein a temperature control operation is performed by controlling ON/OFF operations of said second switch according to a temperature of said sodium sulfur battery using said controller, wherein said sodium sulfur battery is maintained at a constant discharge depth and at a constant temperature by repeating at least one cycle comprising the steps of discharging energy from said sodium sulfur battery to said heater, charging energy from said rectifier to said sodium sulfur battery at predetermined time intervals under the control of said controller, and putting said first switch into an interrupted state and stopping charging of said battery when a voltage or current of said sodium sulfur battery reaches a level that is equal to or higher than a predetermined voltage level or that is equal to or lower than a predetermined current level, and wherein an occurrence of a malfunction of a single cell in said sodium sulfur battery is automatically detected by monitoring a discharging current during energy discharge from said sodium sulfur battery to said heater.

* * * * *

UNITED STATES PATENT AND TRADEMARK OFFICE
CERTIFICATE OF CORRECTION

PATENT NO. : 6,577,103 B2
DATED : June 10, 2003
INVENTOR(S) : Kouji Tanaka et al.

It is certified that error appears in the above-identified patent and that said Letters Patent is hereby corrected as shown below:

Title page,
Please delete the abstract in its entirety and replace with the following ABSTRACT:
-- The present invention provides a space-saving and low-cost emergency power system, which can be installed in a narrow place having limited space, and employs a battery having a relatively longer service life and lower frequency of replacement. The emergency power system includes a circuit having a DC load, rectifier, and a sodium sulfur battery electrically connected to one another. The circuit is adapted such that under normal operating conditions, DC power is supplied from the rectifier to the DC load and the battery is charged. In an emergency, such as a power failure, in which an outage of the rectifier occurs, electric power is automatically supplied from the battery to the DC load. --

Signed and Sealed this

Twenty-third Day of September, 2003

JAMES E. ROGAN
*Director of the United States Patent and Trademark Office*